US005762425A

United States Patent [19]
Ouchi

[11] Patent Number: 5,762,425
[45] Date of Patent: Jun. 9, 1998

[54] ROLLING BEARING UNIT WITH TACHOMETER

[75] Inventor: Hideo Ouchi, Kanagawa, Japan

[73] Assignee: NSK Ltd., Tokyo, Japan

[21] Appl. No.: 788,759

[22] Filed: Jan. 24, 1997

[30] Foreign Application Priority Data

Jan. 24, 1996 [JP] Japan .................. 8-009836
May 20, 1996 [JP] Japan .................. 8-124866

[51] Int. Cl.⁶ .................. F16C 32/00; G01P 3/48
[52] U.S. Cl. .................. 384/448; 324/207.25
[58] Field of Search .................. 384/448, 446; 324/207.25, 173, 174

[56] References Cited

U.S. PATENT DOCUMENTS

| | | | |
|---|---|---|---|
| 4,259,637 | 3/1981 | Bloomfield et al. | 324/207.25 X |
| 4,612,501 | 9/1986 | Costello et al. | 324/207.25 X |
| 4,946,295 | 8/1990 | Hajzler | 384/448 |
| 4,988,220 | 1/1991 | Christiansen et al. | 384/448 |
| 5,018,384 | 5/1991 | Hayashi et al. | 324/174 X |
| 5,085,519 | 2/1992 | Dougherty | 384/448 |
| 5,183,341 | 2/1993 | Ouchi et al. | 384/446 |
| 5,195,831 | 3/1993 | Faye et al. | 384/448 |
| 5,287,738 | 2/1994 | Polinsky et al. | 384/448 X |
| 5,296,805 | 3/1994 | Clark et al. | 324/174 |
| 5,428,289 | 6/1995 | Sahashi et al. | 384/448 X |
| 5,434,503 | 7/1995 | Rigaux et al. | 324/174 |
| 5,451,869 | 9/1995 | Alff | 324/173 |
| 5,470,157 | 11/1995 | Dougherty et al. | 384/448 |
| 5,550,467 | 8/1996 | Goossens | 324/173 |

FOREIGN PATENT DOCUMENTS

| | | |
|---|---|---|
| 0426298 | 5/1991 | European Pat. Off. . |
| 0484661 | 5/1992 | European Pat. Off. . |
| 1156464 | 10/1989 | Japan . |
| 317324 | 2/1991 | Japan . |
| 47270 | 1/1992 | Japan . |
| 44313 | 1/1992 | Japan . |
| 6320902 | 11/1994 | Japan . |
| 731539 | 6/1995 | Japan . |

Primary Examiner—Thomas R. Hannon
Attorney, Agent, or Firm—Sughrue, Mion, Zinn, Macpeak & Seas, PLLC

[57] ABSTRACT

An inserting portion of a holding case holding a sensor is inserted in a fitting hole formed in the cylindrical wall portion of the cover. The hold-down frame portion of a hold-down member pivoted to the cylindrical wall portion is used to press the base portion of the holding case against the outer peripheral face of the cylindrical wall portion. The contact area between the base portion and the cylindrical wall portion is shut with an O-ring, so that any extraneous matter such as rainwater is prevented from penetrating into the cover. Also, a pair of elastic retaining pieces are provided for a plastic material which embeds a sensor. A pair of retaining projections are provided on the outer peripheral edge of a collar portion formed in the leading end portion of a cylindrical holding portion provided for a cover. While a corrugated sheet spring is elastically compressed in between the stepped portion of the plastic material and the collar portion, the retaining projections are each made to engage with retaining holes formed in the elastic retaining pieces. An O-ring retained by the outer peripheral face of the intermediate portion of the small-diameter portion of the plastic material is used to seal up the contact area between the outer peripheral face of the small-diameter portion and the inner peripheral face of the cylindrical holding portion.

4 Claims, 10 Drawing Sheets 5,762,425

1

ROLLING BEARING UNIT WITH TACHOMETER

BACKGROUND OF THE INVENTION

The present invention relates to a rolling bearing unit with a tachometer which is utilized for rotatably supporting an automotive wheel with a suspension system and simultaneously detecting the rotational speed of the wheel.

The rotational speed of a wheel which is rotatably supported with a suspension system needs to be detected in order to control an antilock braking system (ABS) or a traction control system (TCS). For this reason, various kinds of bearing units with a tachometer are conventionally known, and one disclosed, for example, in U.S Pat. No. 4,946,295 is so constructed as to facilitate inspection and repair work by making a sensor easily detachable. FIG. 1 shows such a rolling bearing unit with a tachometer as described in the U.S. patent.

An inner ring 1 as a rotary ring is rotatably supported inside an outer ring 2 as a stationary ring. Therefore, an inner ring raceway track 3 constituting a rotary-side raceway surface is formed on the outer peripheral face of the inner ring 1 as a rotary-side peripheral face, whereas an outer ring raceway track 4 constituting a stationary-side raceway surface is formed on the inner peripheral face of the outer ring 2 as a stationary-side peripheral face. A plurality of rolling elements 5 are installed between the inner ring raceway track 3 and the outer ring raceway track 4. An annular tons wheel 6 is externally fitted and fixed to the outer peripheral face of the end portion of the inner ring 1, whereas a seal ring 7 and a holding ring 8 are internally fitted and fixed to the inner peripheral face of the end portion of the outer ring 2. In other words, a retaining projection 9 formed on the holding ring 8 is made to engage with a retaining recess 11 formed in the inner peripheral face of the end portion of the outer ring 2 via a through-hole 10 formed in the seal ring 7. A sensor 12 supported with the holding ring 8 is situated opposite to the side face of the tone wheel 6. The magnetic properties of the side face of the tone wheel 6 vary alternately at equal intervals in the circumferential direction. The sensor 12 varies its output with the variations of the magnetic properties. Thus the frequency at which the output of the sensor 12 varies is proportional to the rotational speed of the inner ring 1. Therefore, the ABS or the TCS are made controllable by inputting the output of the sensor 12 to a controller.

In the conventional structure shown in FIG. 1, the sensor 12 can be fitted to the end portion of the outer ring 2 as the stationary ring without using a special push-fit jig or the like. However, the structure has not incorporated an arrangement to seal the tone wheel 6 and the sensor 12 from the outside. More specifically, the seal ring 7 has not separated from the outside the portion where the tone wheel 6 and the sensor 12 are installed, though it has separated from the outside the portion where the rolling elements 5 are installed. Therefore, there is the possibility of allowing waterdrops to stay in a very small gap 13 between the tone wheel 6 and the sensor 12 at the time of a rainfall, for example. If an automobile is started moving in such a condition that waterdrops are frozen when it is cold, one of the tone wheel 6 and the sensor 12 or both of them may be damaged.

SUMMARY OF THE INVENTION

In view of the foregoing problems, it is therefore an object of the present invention to provide a rolling bearing unit with a tachometer, which is capable of making a sensor easily detachable and besides preventing the sensor and a tone wheel from being damaged because of frozen waterdrops.

Like the aforementioned conventional rolling bearing unit with a tachometer, a rolling bearing unit with a tachometer according to the present invention comprises a stationary ring which has a stationary-side raceway surface on a stationary-side peripheral face and is not rotated at the time of its use, a rotary ring which has a rotary-side raceway surface on a rotary-side peripheral face and is rotated at the time of its use, a plurality of rolling elements provided between the stationary-side raceway surface and the rotary-side raceway surface, a tone wheel which is generally annular and has a flange surface existing in a direction perpendicular to the axis of the rotary ring while supported with the rotary ring and has the magnetic properties of the flange surface alternately varied at equal intervals over the circumferential direction, a cover which is fixedly secured to the end portion of the stationary ring and used to close the opening of the end portion of the stationary ring, and a sensor which faces the flange surface of the tone wheel in such a state that it is supported with the cover.

Particularly in the rolling bearing unit with a tachometer according to a first aspect of the present invention, a fitting hole for communicating the inner peripheral face of a cylindrical wall portion with the outer peripheral face thereof is formed in the cylindrical wall portion which is a part of the cover and exists outwardly in the diametric direction of the tone wheel, a holding case for holding the sensor has an inserting portion which is inserted through the fitting hole from the outer diameter side of the cylindrical wall portion to the inner diameter side thereof and a base portion which is brought into contact with the peripheral portion of the fitting hole in the outer peripheral face of the cylindrical wall portion; the base portion faces the outer peripheral face of the cylindrical wall portion in such a state that the inserting portion has been inserted in the fitting hole; a space between the holding case and the fitting hole is sealed up with a sealing member; and the base portion of a hold-down member for holding down the base portion of the holding case toward the outer peripheral face of the cylindrical wall portion is pivotally fitted to a position on the outer peripheral face of the cylindrical wall portion and close to the fitting hole so that the leading end portion of the hold-down member elastically presses the base portion of the holding case against the outer peripheral face of the cylindrical wall portion.

Since the rolling bearing unit with a tachometer thus constructed according to the first aspect of the present invention functions like the aforementioned conventional rolling bearing unit, a wheel is rotatably supported with a suspension system and besides the rotational speed of the wheel is detected.

When the sensor is fitted to the stationary ring, moreover, the inserting portion of the holding case is inserted in the cover through the fitting hole and the sensor held in the holding case is made to face the flange surface of the tone wheel. Subsequently, the leading end portion of the hold-down member that has been placed aside is used to press the base portion of the holding case against the outer peripheral face of the cylindrical wall portion constituting the cover. When the rotary ring is rotated in this state, the ABS or TCS is made controllable by fetching the output signal of the sensor from the harness and sending the signal to the controller since the output signal of the sensor varies as the rotary ring rotates.

Further, the contact area between the holding case and the fitting hole is sealed up by the sealing member while the holding case is fitted into the fitting hole portion, whereby extraneous matter is prevented from penetrating into the cover through the space between the holding case and the fitting hole. Thus, it is possible to prevent the sensor and the tone wheel from being damaged by freezing.

Further, in the rolling bearing unit with a tachometer according to a second aspect of the present invention, a cylindrical holding portion having an axis substantially parallel to the axis of the rotary ring is formed in a portion where it faces the flange surface of the tone wheel in a part of the cover so as to communicate the inside of the cover with the outside thereof, and the sensor together with the end portion of a harness for fetching the output signal of the sensor is embedded in a plastic material which can freely be inserted in a cylindrical holding portion. An engaging means for properly axially positioning and supporting the plastic material in the cylindrical holding portion is provided between the cylindrical holding portion and the plastic material, and a sealing means for preventing extraneous matter from penetrating into the cover through the contact area between the inner peripheral face of the cylindrical holding portion and the outer peripheral face of the plastic material is also provided therebetween.

Since the rolling bearing unit with a tachometer thus constructed according to the second aspect of the present invention functions like the aforementioned conventional rolling bearing unit, a wheel is rotatably supported with a suspension system and besides the rotational speed of the wheel is detected.

When the sensor is fitted to the stationary ring, moreover, the plastic material is inserted in the cylindrical holding portion and then the engaging means is used to properly position the plastic material in the cylindrical holding portion. The sensor faces the flange surface of the tone wheel in that state. Therefore, the ABS or TCS is made controllable by fetching the output signal of the sensor from the harness and sending the signal to the controller since the output signal of the sensor varies as the rotary ring rotates.

Further, the contact area between the inner peripheral face of the cylindrical holding portion and the outer peripheral face of the plastic material is sealed up by the sealing means while the plastic material remains in the cylindrical holding portion, whereby extraneous matter is prevented from penetrating into the cover through the gap between both the peripheral faces. Therefore, the sensor and the tone wheel are prevented from being damaged because of frozen extraneous matter.

DETAILED DESCRIPTION OF THE INVENTION

Figure 1:
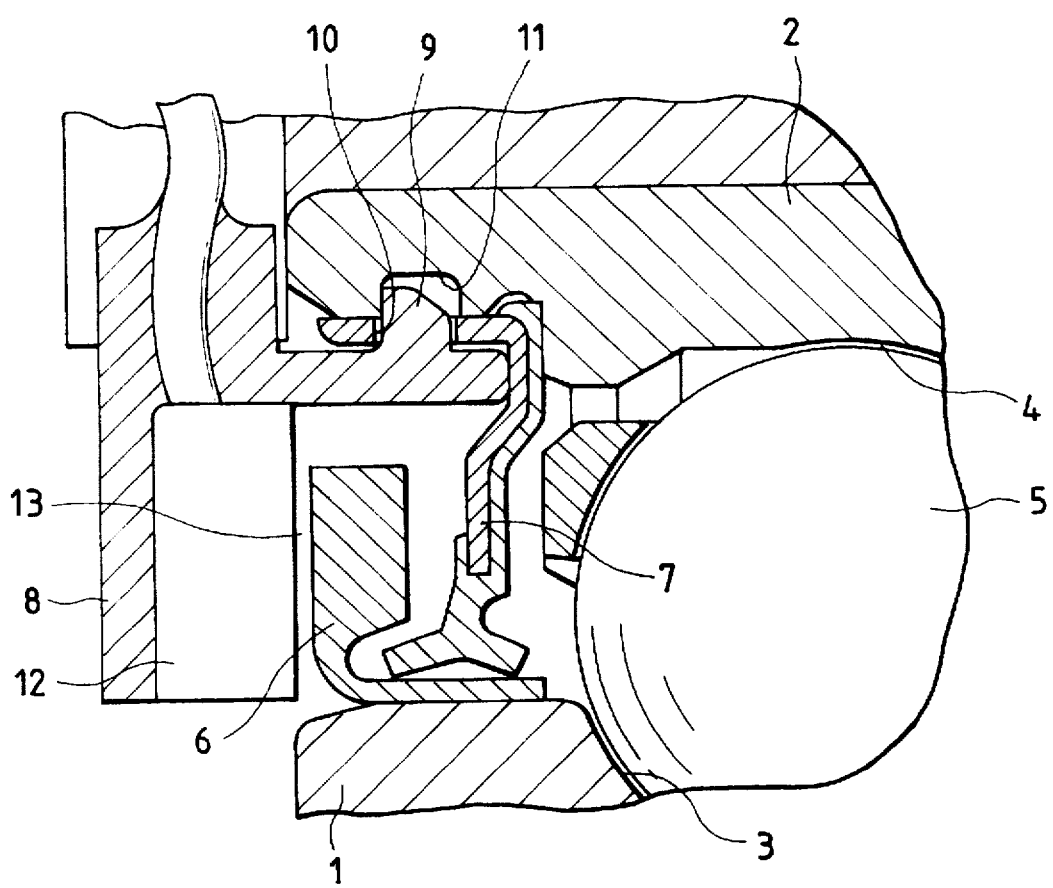
FIG. 1 is partial sectional view of an example of a conventional structure.
Figure 2:
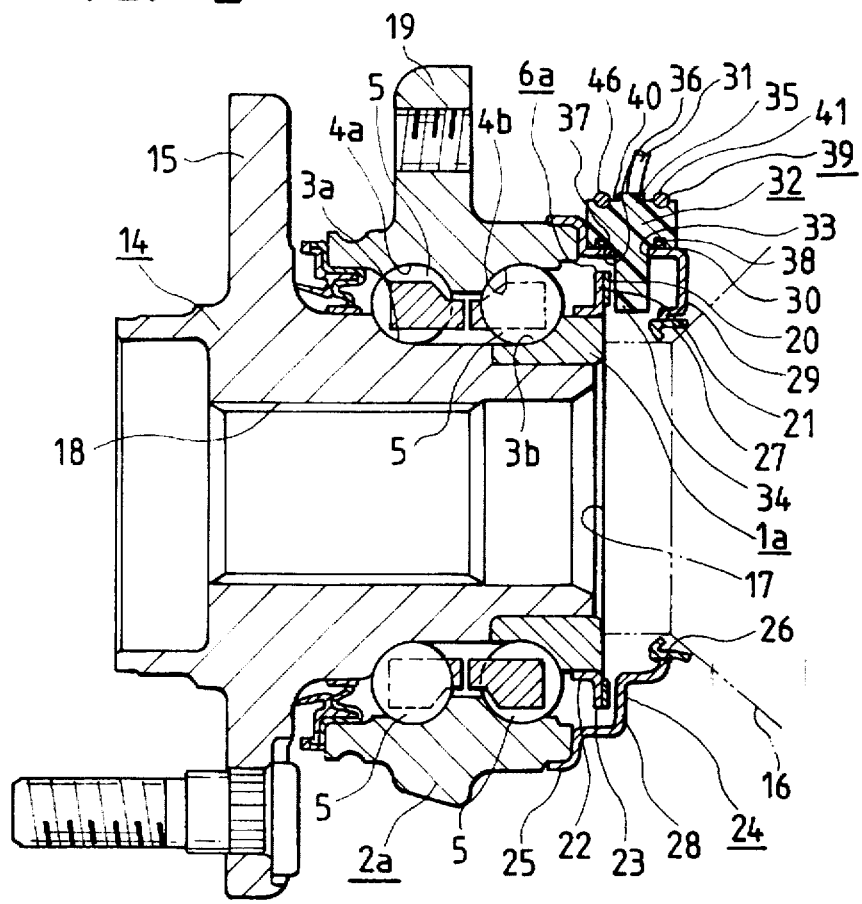
FIG. 2 is a sectional view of a first embodiment of the present invention.

FIGS. 2–5 show a first embodiment of the present invention, in which the present invention is embodied in a rolling bearing unit for supporting driven wheels (rear wheels of an FR vehicle or front wheels of an FF vehicle) with suspension systems. A flange 15 for fixing a wheel is installed on the outer peripheral face of outer end portion (the end portion as an outside in the width direction when incorporated in the vehicle, i.e., the left end portion of FIG. 1) of a hub 14 as a rotary ring, and an inner ring raceway track 3a constituting a rotary-side raceway surface is formed in the intermediate portion of an outer peripheral face as a rotary-side peripheral face. An inner ring 1a having an inner ring raceway track 3b constituting a rotary-side raceway surface is externally fitted and fixed to an outer peripheral face as also a rotary-side peripheral face in the inner end portion (the end portion as the central side in the width direction when incorporated in the vehicle, i.e., the right end portion of FIG. 1) of the outer peripheral face of the hub 14. The inner edge face (the right edge face of FIG. 1) of the inner ring 1a is protruded inward than the inner edge face of the hub 14.

A stepped portion 17 of a constant velocity joint 16 is brought into contact with the inner edge face of the inner ring 1a when incorporated in the vehicle, so that the inner ring 1a is prevented from being loosened. In other words, a spline hole 18 is formed in the central part of the hub 14 and when incorporated in the vehicle, a spline shaft (not shown) attached to the constant velocity joint 16 is passed through the spline hole 18. Further, the hub 14 and the inner ring 1a are axially held between a nut (not shown) screwed into the leading end portion of the spline shaft and the stepped portion 17.

Further, an outer ring 2a as a stationary ring has a mount 19 formed on its outer peripheral face and used for supporting itself with the knuckle of a suspension system (not shown), and double rows of outer ring raceway tracks 4a, 4b formed on its inner peripheral face as a stationary-side peripheral face. A plurality of rolling elements 5, 5 are each installed in between the outer ring raceway tracks 4a, 4b constituting stationary-side peripheral surfaces and the inner ring raceway tracks 3a, 3b and besides the hub 14 is rotatably supported inside the outer ring 2a supported with the suspension system on the mount 19. Although balls are shown as the rolling elements 5, 5 in the embodiment above, taper rollers may be used in the case of an automotive rolling bearing unit which normally weighs much.

Further, a tone wheel 6a is externally fitted and fixed to the end portion of the inner ring 1a, which end portion is out of the inner ring raceway track 3b. The tone wheel 6a is a combination of a support ring 20 and a tone wheel body 21. The support ring 20 is made of a metal plate such as a steel plate which is generally annular and L-shaped in cross section; to be precise, the support ring 20 is formed with a cylindrical portion 22 externally fitted and fixed to the end portion of the inner ring 1a and a circular ring portion 23 which is bent at a right angle outwardly in the diametric direction from the end edge portion of the cylindrical portion 22. The inner side face (the right side face of FIG. 1) of the tone wheel body 21 attached to the side face of the circular ring portion 23 forms a flange surface existing in a direction perpendicular to the axis of the hub 14. The tone wheel body 21 is formed of a permanent magnet such as a rubber magnet containing ferrite powder and generally in the form of a circular ring. Moreover, the tone wheel body 21 is magnetized in the axial direction (the lateral direction of FIG. 1) and the direction of magnetization is varied alternately at equal intervals in the circumferential direction. Therefore, S- and N-poles on the side face of the tone wheel body 20 are arranged alternately at equal intervals.

Further, a cover 24 is externally fitted and fixed to the end portion of the opening of the outer ring 2a. The cover 24 is formed into a ring shape by subjecting a metal plate such as a steel plate, a stainless steel plate or an aluminum alloy plate to plastic working such as deep drawing. A fitting portion 25 for externally fitting and fixing the cover 24 to the end portion of the opening of the outer ring 2a is formed in the peripheral edge portion of the opening of the cover 24, and a circular hole 26 for passing the constant velocity joint 16 is formed in the central portion of the cover 24. A sealing lip 27 made of elastic material such as rubber, elastomer or the like is attached to the whole inner peripheral edge portion of the circular hole 26. When incorporated in the vehicle, the sealing lip 27 is brought into slidable contact with the outer peripheral face of the constant velocity joint 16 to shut the gap between the cover 24 and the constant velocity joint 16 so as to prevent extraneous matter such as rainwater from penetrating into the cover 24 therethrough.

A sensor fitting portion 29 is formed in a part of the intermediate portion 28 situated between the fitting portion 25 and the circular hole 26, the intermediate portion being axially protruded. The outer peripheral wall of the sensor fitting portion 29 is a cylindrical wall portion 30 existing outwardly in the diametric direction of the tone wheel 6a. A plastic holding case 32 for holding the embedded end portion of a harness 31 for fetching the output signal of the sensor is fitted to the cylindrical wall portion 30. The holding came 32 has an inserting portion 34 to be inserted without a backlash in a fitting hole 33 formed in the cylindrical wall portion 30 from the outer diameter side of the cylindrical wall portion 30 to the inner diameter side thereof (upward to downward of FIG. 1), and a base portion whose diameter is greater than that of the inserting portion 34. In this embodiment, a rectangular hole is formed as the fitting hole 33 and so in a rectangle in cross section as the inserting portion 34, whereby the holding case 32 is not rotated when the inserting portion 34 in inserted in the fitting hole 33.

The inner edge face 36 (the edge face where the inserting portion 34 is provided, the lower side of FIG. 1) of the base portion 35 is brought into contact with the peripheral portion of the fitting hole 33 on the outer peripheral face of the cylindrical wall portion 30 after the base portion of the inserting portion 34 is inserted in the fitting hole 33. A part of the inner edge face 36 is used to surround the base portion of the inserting portion 34 and a retaining groove 37 for surrounding the whole periphery of the base portion 34 thereof is formed in that part. An O-ring 38 is retained by the retaining groove 37 as a sealing member. The diameter of the section of the O-ring 38 is set greater than the depth of the retaining groove 37. Therefore, the O-ring 38 is elastically pressed against the outer peripheral face of the cylindrical wall portion 30 when the inner edge face 36 is brought into contact with the outer peripheral face of the cylindrical wall portion 30, so that the space between the holding case 32 and the fitting hole 33 is sealed up. In this case, the inner diameter of the O-ring 38 in a free state is made slightly smaller than the diameter of the inner peripheral wall of the retaining groove 37. Consequently, the O-ring 38 is kept engaging with the retaining groove 37 and prevented from slipping off while it is retained by the retaining groove 37.

The sensor is formed of an IC which combines a detection element such as a Hall element or an MR element for varying the output signal in accordance with variation in the direction of magnetic flux or density with a power supply circuit and a waveform shaping circuit. Of these two circuits, the power supply circuit is used for adjusting the voltage applied to the detection element. The waveform shaping circuit is used for shaping the waveform of the output signal of the detection element. Therefore, the harness 31 functions as what supplies electricity to the power supply circuit and also transmits to a controller of an ABS or TCS the signal sent from the waveform shaping circuit, the waveform of which has been subjected to waveform shaping.

Figure 3:
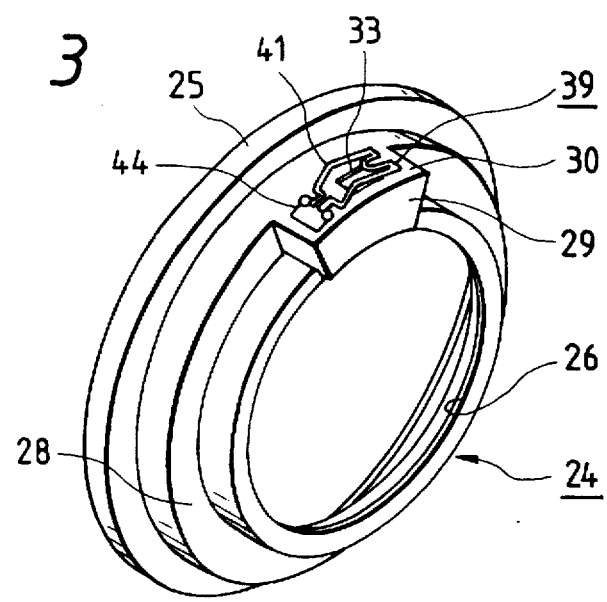
FIG. 3 is a perspective view of a cover fitted with a hold-down member.
Figure 4:
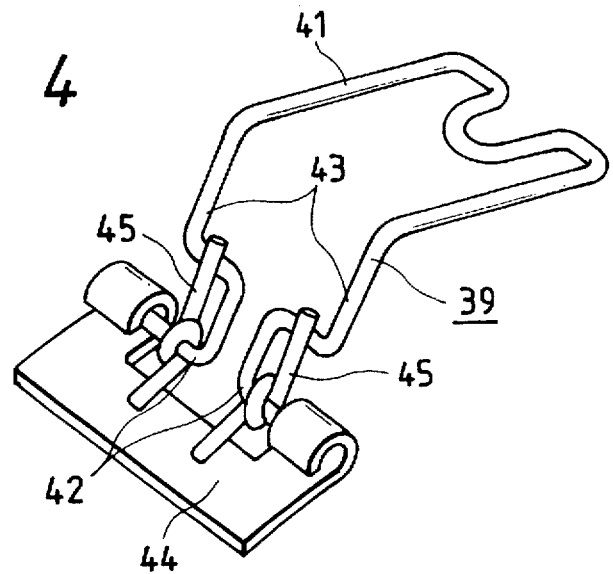
FIG. 4 is an enlarged perspective view of the hold-down member.
Figure 5:
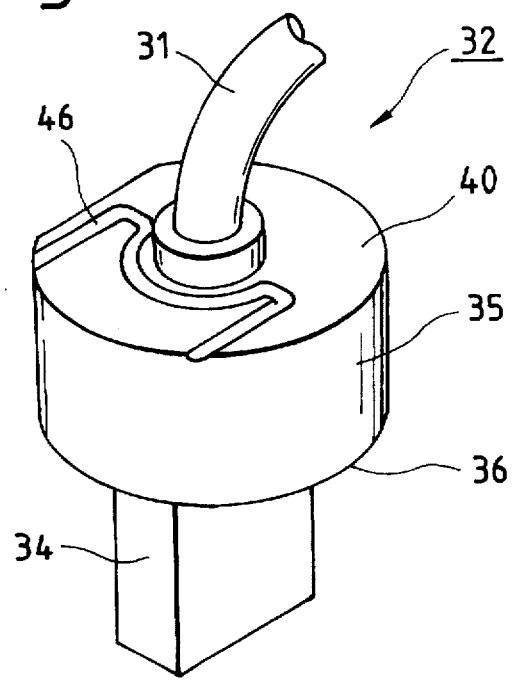
FIG. 5 is a perspective view of a holding case holding a sensor.

On the other hand, a hold-down member 39 is provided as shown in FIG. 4 in the proximity of the fitting hole 33 on the outer peripheral face of the cylindrical wall portion 30. The hold-down member 39 is formed by bending a wire, for example, having sufficient flexural rigidity and has a hold-down frame portion 41 for holding down the outer edge face 40 (the edge face opposite to the side where the inserting portion 34 is provided, the upper side of FIG. 2), pivotal support portions 42, 42 provided at the base portion, and coupling portions 43, 43 for making continuous the hold-down frame portion 41 and both the pivotal support portions 42, 42. Of these portions, the pivotal support portions 42, 42 are pivotally supported with a pivotal support bracket 44. The pivotal support bracket 44 is, as shown in FIG. 3, secured by spot welding or the like to the side face of the fitting hole 33. The hold-down frame portion 41 in this state faces the fitting hole 33. Torsion coil springs 45, 45 are provided between the pivotal support bracket 44 and the hold-down member 39, which is supplied with elastic force urging itself toward the outer peripheral face of the cylindrical wall portion 30. A mating groove 46 for receiving the hold-down frame portion 41 without a backlash is formed on the outer edge face 40 of the base portion 35 of the holding case 32, the outer edge face 40 being situated opposite to the hold-down frame portion 41. While the outer edge face 40 is held down by the hold-down frame portion 41, the hold-down frame portion 41 mates with the mating groove 46 and the positioning of the holding case 32 is determined.

In the case of such a rolling bearing unit with a tachometer as described above, the wheel fixedly secured to the flange 15 fitted to the end portion of the hub 14 can rotatably be supported with the suspension system. When the tone wheel 6a together with the inner ring 1a externally fitted and fixed to the end portion of the hub 14 is rotated as the wheel turns, the output of the sensor 12a, which is embedded in the inserting portion 34 constituting the holding case 32 and faces the inner face of the tone wheel body 21 constituting the tone the wheel 6a, varies. Since the frequency at which the output of the sensor varies is proportional to the rotational speed of the wheel, if the output signal of the sensor is input to a controller (not shown) via the harness 30, the ABS or TCS can properly be controlled by obtaining the rotational speed of the wheel.

The aforementioned rolling bearing unit with a tachometer thus arranged according to the present invention functions as what rotatably supports a wheel and detects the rotational speed of the wheel in the same way that any known conventional rolling bearing unit with a tachometer functions. Particularly, the rolling bearing unit with a tachometer according to the present invention to capable of making the holding came 32 with the sensor embedded therein easily detachable from the cover 24 secured to the outer ring 2a without using a special push-fit jig or the like.

More specifically, when the holding case 32 is fitted in the outer ring 2a, the inserting portion 34 of the holding case 32 is inserted in the cover 24 through the fitting hole 33 formed in the cylindrical wall portion 30. At this time, the hold-down member 39 is placed aside from the opening portion of the fitting hole 33 against the elastic force of the torsion coil springs 45. The inserting portion 34 is then inserted in the fitting hole 33 and the sensor embedded in the inserting portion 34 is made to face the inner side face of the tone wheel body 21 constituting the tone wheel 6a. Further, the hold-down frame portion 41 of the hold-down member 39 that has been placed aside is used to hold down the outer edge face 40 of the bass portion 35 of the holding case 32. The hold-down frame portion 41 is then made to engage with the mating groove 46.

Through these steps of work, the holding case 32 is supported in position without a backlash with respect to the cover 24. The O-ring 38 is elastically held between the base portion 35 and the outer peripheral face of the cylindrical wall portion 30 so as to seal up the space between the holding case 32 and the fitting hole 33, whereby extraneous matter such as rainwater is prevented from penetrating into the cover 24 through the space. Since the space between the inner peripheral edge of the cover 24 and the outer peripheral face of the constant velocity joint 16 is sealed up by the sealing lip 27, no extraneous matter is allowed to penetrate into the cover 24 through the space.

Further, the hold-down member 39 is made to swing against the elastic force of the torsion coil springs 45 and the hold-down frame portion 41 is set aside from the opening portion of the fitting hole 33, whereby the holding case 32 becomes detachable from the fitting hole 33. Therefore, the sensor is easily repaired and replaceable when it is out of order.

Figure 6:
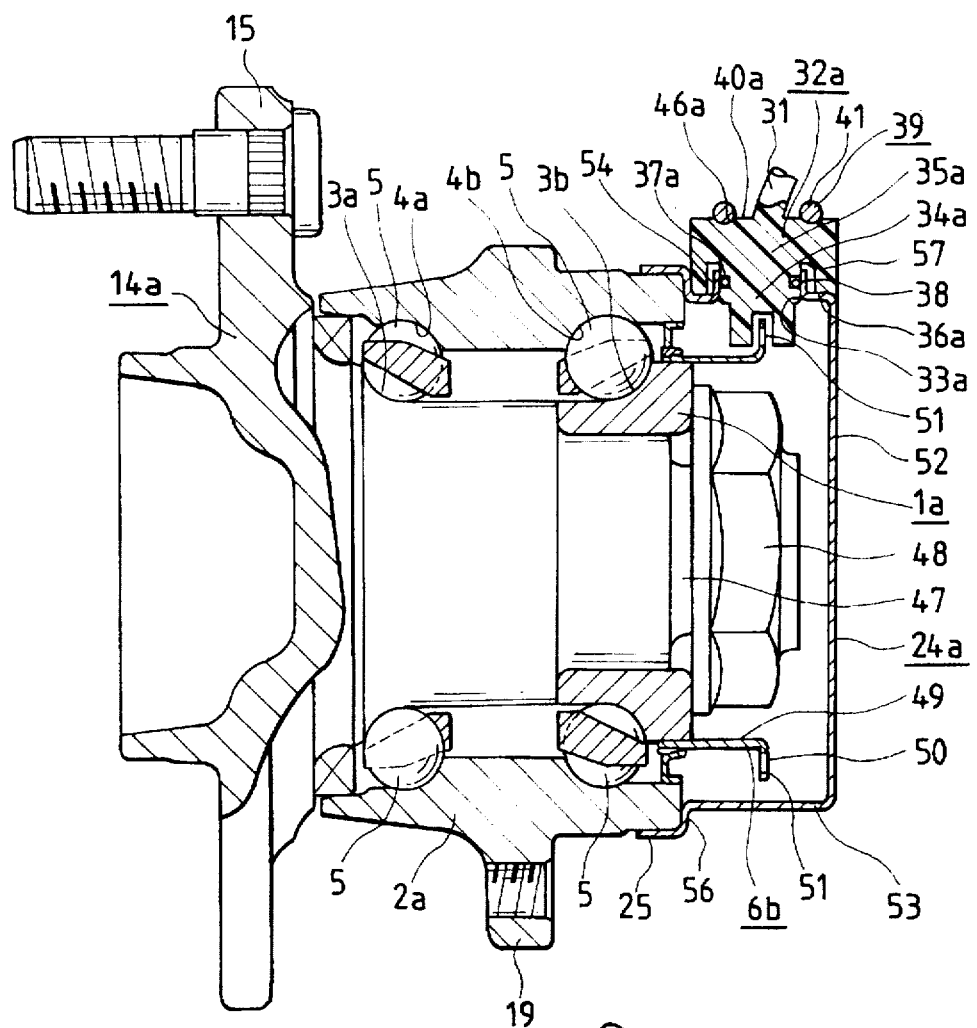
FIG. 6 is a sectional view showing a second embodiment of the present invention.
Figure 7:
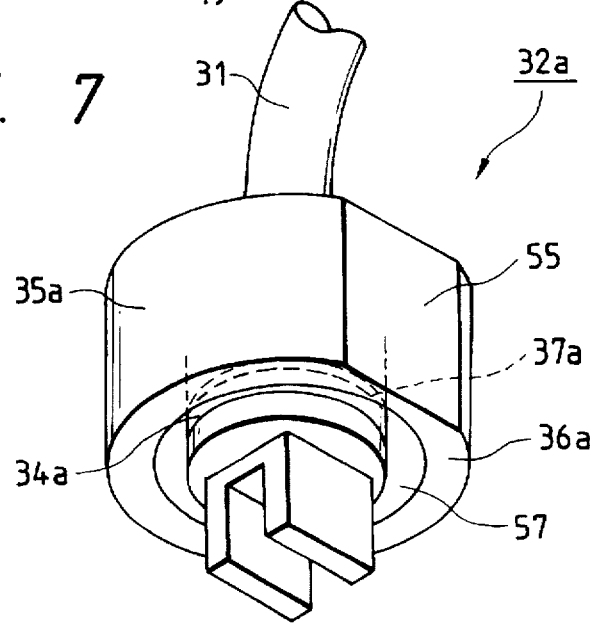
FIG. 7 is a perspective view of a holding case holding a sensor.
Figure 8:
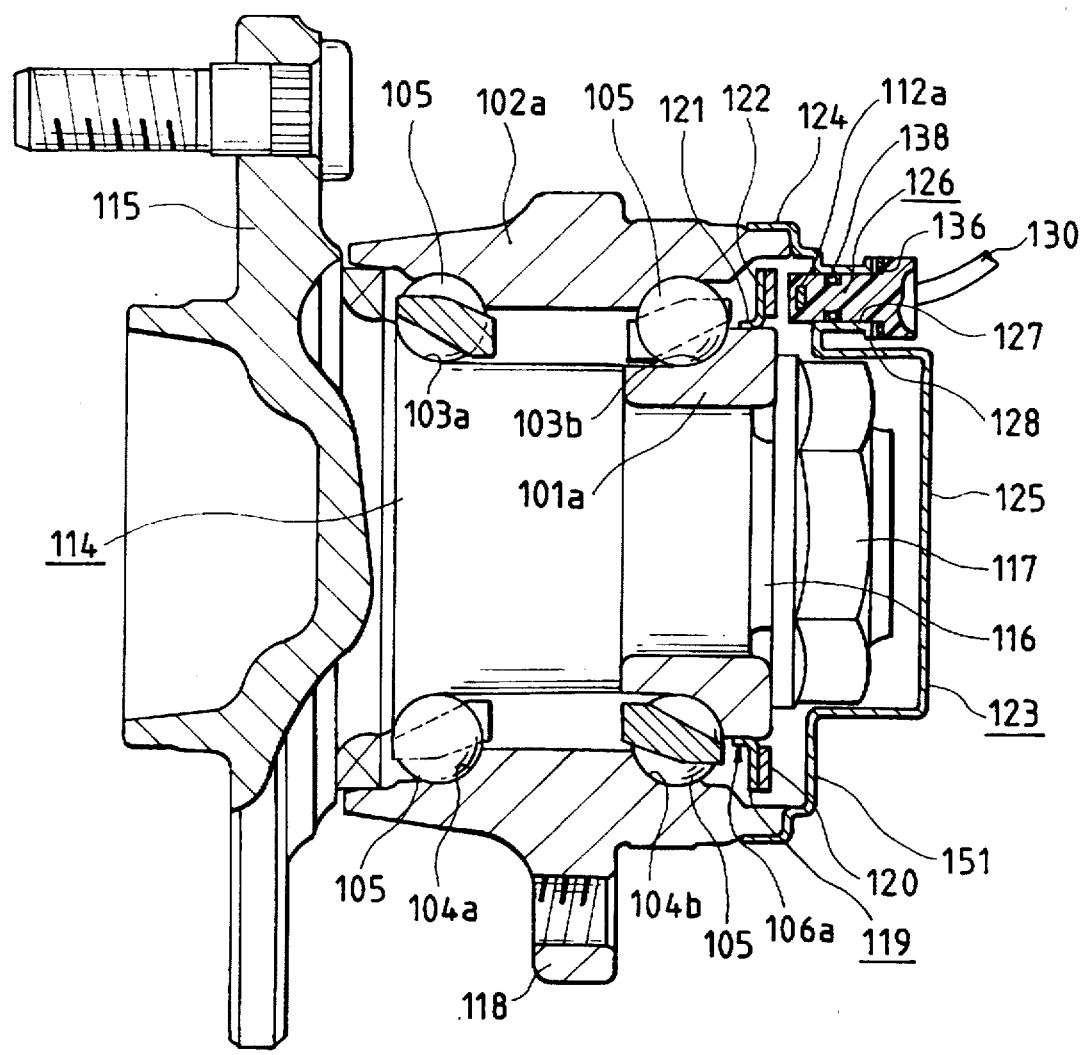
FIG. 8 is a sectional view taken on line A—A of FIG. 9 illustrating a third embodiment of the present invention.
Figure 9:
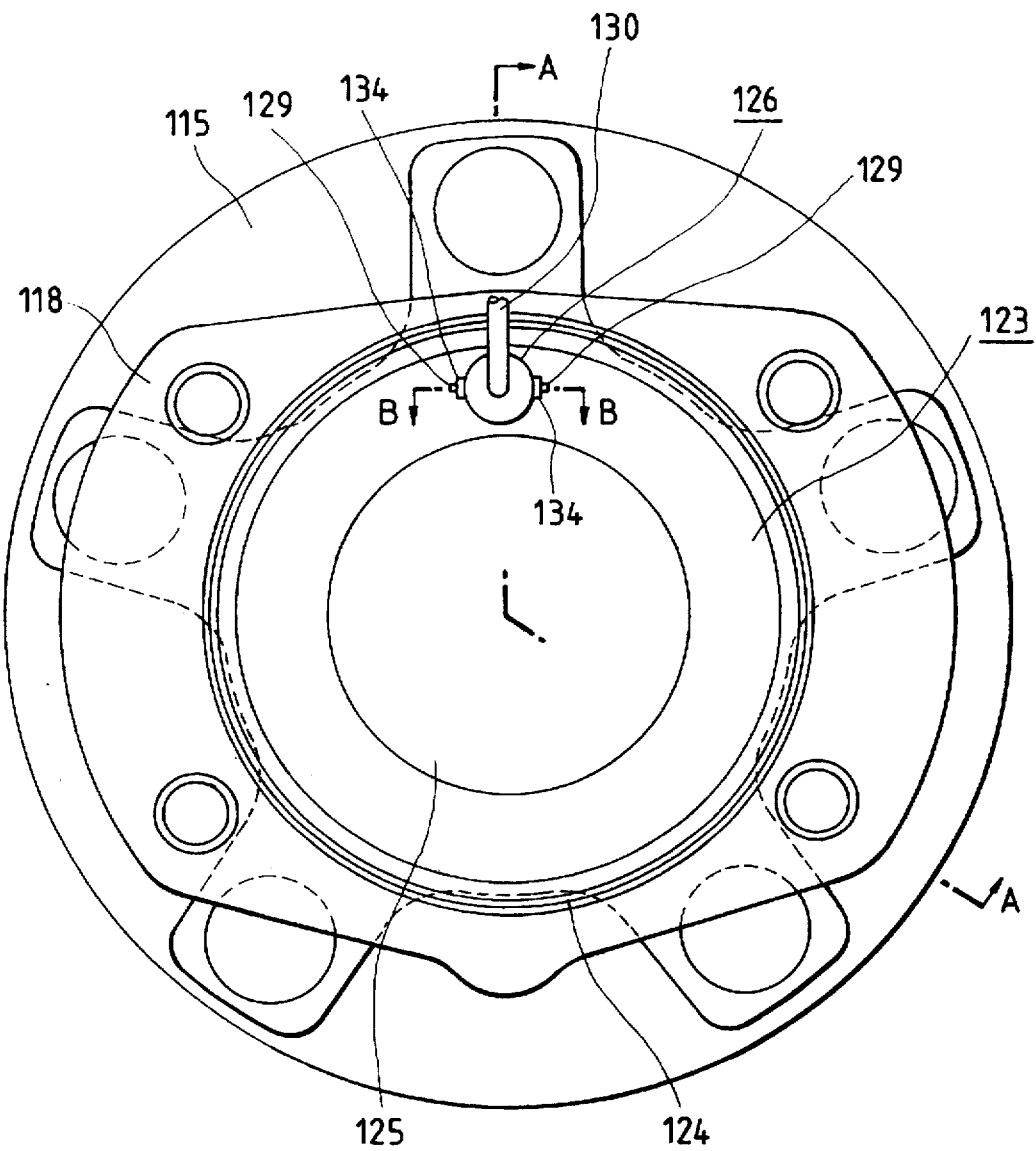
FIG. 9 is a side view as viewed from the right side of FIG. 8.
Figure 10:
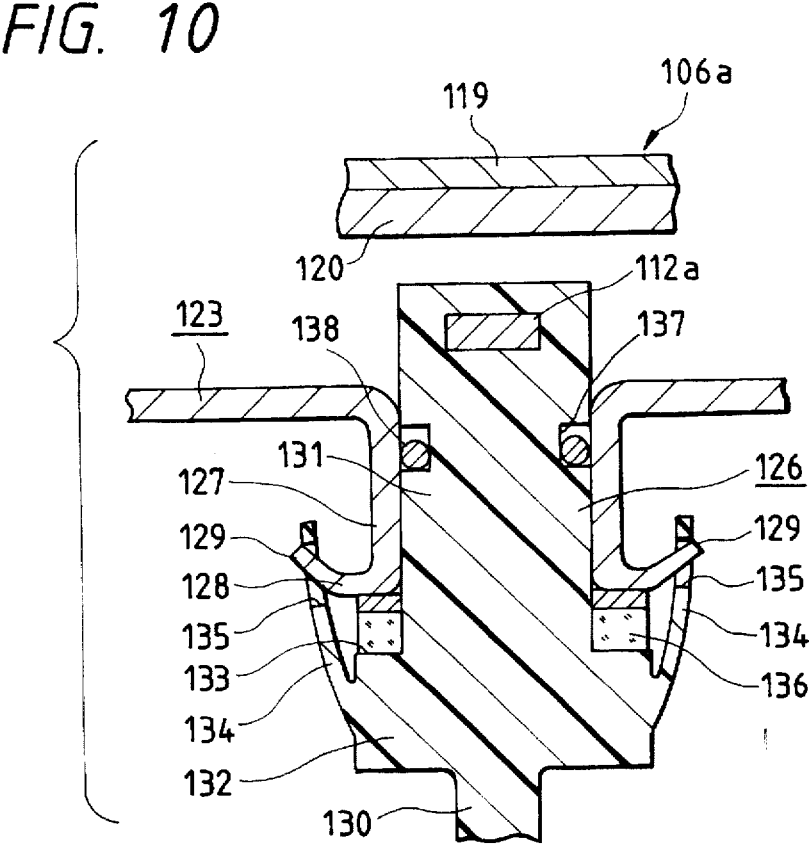
FIG. 10 is an enlarged sectional view taken on line B—B of FIG. 9.
Figure 11:
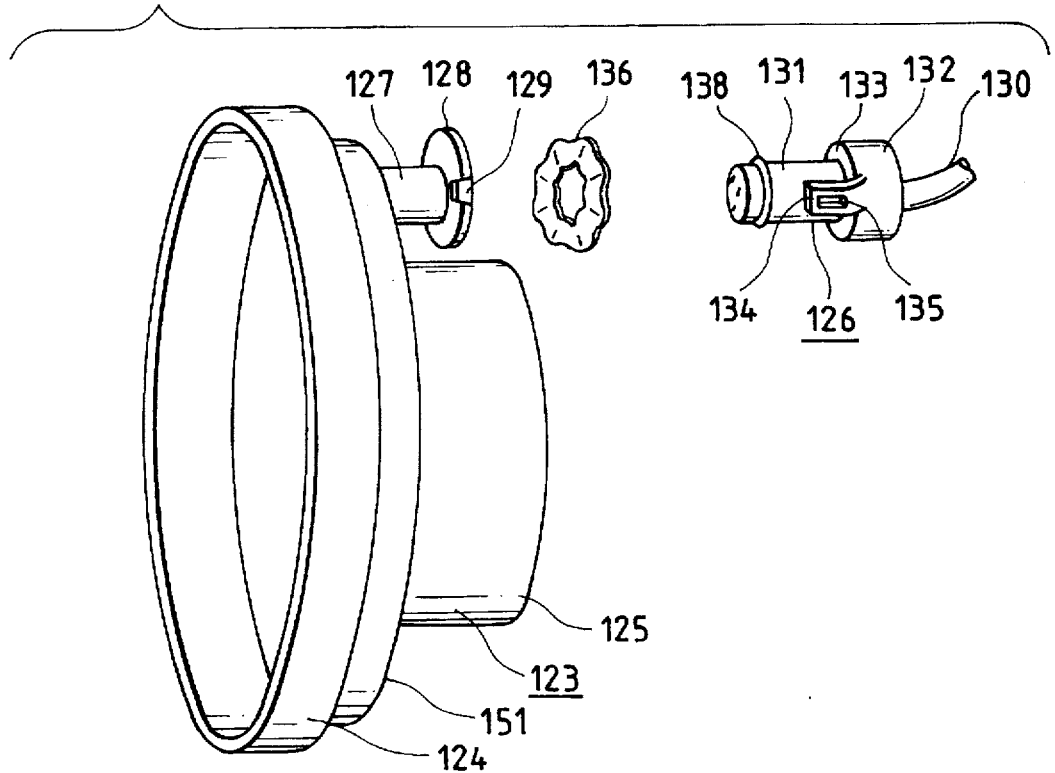
FIG. 11 is an exploded perspective view of a cover and a sensor.

FIGS. 6–7 show a second embodiment of the present invention, in which the present invention is embodied in a rolling bearing unit for supporting non-driven wheels (front wheels of an FR vehicle or rear wheels of an FF vehicle) with suspension systems. A flange 15 for fixing a wheel is installed on the ouster peripheral face of outer end portion (the left end portion of FIG. 6) of a hub 14a as a rotary ring, and an inner ring raceway track 3a constituting a rotary-side raceway surface is formed in the intermediate portion of the outer peripheral face of the hub 14a as a rotary-side peripheral face. An inner ring 1a having an inner ring raceway track 3b constituting a rotary-side raceway surface is externally fitted and fixed to an outer peripheral face as also a rotary-side peripheral face in the inner end portion (the right end portion of FIG. 6) of the outer peripheral face of the hub 14a. A nut 48 is screwed into a male screw portion 47 formed in the inner end portion of the hub 14a, whereby the inner ring 1a is held down.

Further, an outer ring 2a as a stationary ring has a mount 19 formed on its outer peripheral face and used for supporting itself with the knuckle of a suspension system (not shown), and double rows of outer ring raceway tracks 4a, 4b formed on its inner peripheral face as a stationary-side peripheral face. A plurality of rolling elements 5, 5 are each installed in between the outer ring raceway tracks 4a, 4b constituting stationary-side peripheral surfaces and the inner ring raceway tracks 3a, 3b, and besides the hub 14a is rotatably supported inside the outer ring 2a supported with the suspension system through the mount 19. Like the aforementioned first embodiment, taper rollers in place of balls may also be used as the rolling elements 5, 5.

Further, a tone wheel 6b is externally fitted and fixed to the end portion of the inner ring 1a, which end portion is out of the inner ring raceway track 3b. The tone wheel 6b is made of light-shielding plate material such as a thin metal sheet which is generally annular and L-shaped in cross section and provided with a cylindrical portion 49 and a flange portion 50 which is bent at a right angle outwardly in the diametric direction from the inner end portion of the cylindrical portion 49. The tone wheel 6b like this is externally and tightly fitted and fixed to the inner end portion of the inner ring 1a. Moreover, a number of slit-like through-holes 51, 51 are formed in the flange portion 50 at equal intervals in the circumferential direction. These many through-holes 51, 51 are used to vary the optical properties of the flange portion 50 alternately at equal intervals in the circumferential direction.

Further, a cover 24a is externally fitted and fixed to the end portion of the opening of the outer ring 2a. The cover 24a is formed by subjecting a metal plate such as a steel plate, a stainless steel plate or an aluminum alloy plate to plastic working, for example, deep drawing. A fitting portion 25 for externally fitting and fixing the cover 24a to the end portion of the opening of the outer ring 2a is formed in the peripheral edge portion of the opening of the cover 24a, and a protruding portion 52 for preventing the cover 24a from interfering with the nut 48 and the tone wheel 6b is formed in the central portion of the cover 24a. Moreover, a circular fitting hole 33a is formed by barring in a part of a cylindrical wall portion 53 constituting the outer peripheral wall of the protruding portion 52. Therefore, a cylindrical wall 54 protruding from the outer peripheral face of the cylindrical wall portion 53 is provided on the peripheral edge portion of the fitting hole 33a.

A plastic holding case 32a which surrounds the embedded sensor and the end portion of the harness 31 for use in fetching the output signal of the sensor is fitted to the inside of the fitting hole 33a. The holding case 32a is provided with an inserting portion 34a which is inserted without a backlash from the outer diameter side of the cylindrical wall portion 53 of the cylindrical wall 54 formed on the peripheral edge portion of the fitting hole 33a to the inner diameter side thereof (from the upper to lower portion of FIG. 6) and a base portion 35a whose diameter is greater than that of the inserting portion 34a. In this embodiment, as shown in FIG. 7, a flat surface 55 is formed in a part of the outer peripheral face of the base portion 35a. The inserting portion 34a can be inserted completely in the cylindrical wall 54 only when the flat surface 55 and a stepped portion 56 for making continuous the fitting portion 25 of the cover 24a and the protruding portion 52 are matched. When the inserting portion 34a has completely been inserted in the fitting hole 33a like this, the holding case 32a is not rotated since the flat surface 55 remains engaged with the stepped portion 56.

Further, a cylindrical recess 57 is formed in the inner edge face (the lower edge face of FIG. 6) of the base portion 35a.

A retaining groove 37a is also formed in the whole side face of the inner diameter side of the recess 57. The O-ring 38 is fitted in the retaining groove 37a. In such a state that the inserting portion 34a has been inserted in the fitting hole 33a until the inner edge face 36a is brought into contact with the outer peripheral face of the cylindrical wall portion 53, the outer peripheral edge of the O-ring 38 is elastically pressed against the inner peripheral face of the cylindrical wall 54 so as to seal up the gap between the holding case 32a and the fitting hole 33a.

The sensor embedded and held in the inserting portion 34a in this embodiment serves as a photoelectric sensor having a light-emitting element and a light-receiving element. Therefore, the leading end portion of the inserting portion 34a is made to branch off, whereby the light-emitting and light-receiving elements are embedded and hold opposite to each other. The harness 31 has wiring for supplying power to the light-emitting element and wiring for fetching a signal from the light-receiving element. Consequently, the rotational speed of a wheel is obtained by sending the signal fetched from the harness 31 to a controller, whereby the ABS or TCS is properly controllable also in this embodiment of the invention.

According to this embodiment of the invention, further, a mating groove 46a for mating with the outer edge face (the upper edge face of FIG. 6) 40a of the base portion 35a is formed so that the hold-down frame portion 41 of the hold-down member 39 can freely mate with the mating groove 46a. The structure and function of the portion used to hold down the base portion 35a on the outer peripheral face of the cylindrical wall portion 53 of the cover 24a are similar to those described in the first embodiment of the invention. Therefore, it is facilitated to make the sensor detachable from the outer ring 2a as a stationary ring in this embodiment of the invention as in the first embodiment thereof.

FIGS. 8–11 show a third embodiment of the present invention, in which the present invention is embodied in a rolling bearing unit for supporting non-driven wheels (front wheels of an FR vehicle or rear wheels of an FF vehicle) with suspension systems. A flange 115 for fixing a wheel is installed on the outer peripheral face of one end portion (the left end portion of FIG. 8) of a hub 114 as a rotary ring, and an inner ring raceway track 103a constituting a rotary-side raceway surface is formed in the intermediate portion of an outer peripheral face as a rotary-side peripheral face. An inner ring 101a having an inner ring raceway track 103b constituting a rotary-side raceway surface is externally fitted and fixed to an outer peripheral face as also a rotary-side peripheral face in the other end portion (the right end portion of FIG. 8) of the outer peripheral face of the hub 114. A nut 117 is screwed into a male screw portion 116 formed in the other end portion of the hub 114, whereby the inner ring 101a is held down.

Further, an outer ring 102a as a stationary ring has a mount 118 formed on its outer peripheral face and used for supporting itself with the knuckle of a suspension system (not shown), and double rows of outer ring raceway tracks 104a, 104b formed on its inner peripheral face as a stationary-side peripheral face. A plurality of rolling elements 105, 105 are each installed in between the outer ring raceway tracks 104a, 104b constituting stationary-side peripheral surfaces and the inner ring raceway tracks 103a, 103b and besides the hub 114 in rotatably supported inside the outer ring 102a supported with the suspension system on the mount 118. Although balls are shown as the rolling elements 105, 105 in the embodiment above, taper rollers may be used in the case of an automotive rolling bearing unit which normally weighs much.

Further, a tone wheel 106a is externally fitted and fixed to the end portion of the inner ring 101a, which end portion is out of the inner ring raceway track 103b. The tone wheel 106a is a combination of a support ring 119 and a tone wheel body 120. The support ring 119 is made of a metal plate such as a steel plate which is generally annular and L-shaped in cross sections to be precise, the support ring 119 is formed with a cylindrical portion 121 externally fitted and fixed to the end portion of the inner ring 101a and a circular ring portion 122 which is bent at a right angle outwardly in the diametric direction from the end edge portion of the cylindrical portion 121. The side face of the tone wheel body 120 attached to the side face of the circular ring portion 122 forms a flange surface existing in a direction perpendicular to the axis of the hub 114. The tone wheel body 120 is formed of a permanent magnet such as a rubber magnet containing ferrite powder and generally in the form of a circular ring. Moreover, the tone wheel body 120 is magnetized in the axial direction (the lateral direction of FIG. 8 and the vertical direction of FIG. 10) and the direction of magnetization is varied alternately at equal intervals in the circumferential direction. Therefore, S- and N-poles on the side face of the tone wheel body 120 are arranged alternately at equal intervals.

Further, a cover 123 is externally fitted and fixed to the end portion of the opening of the outer ring 102a. The cover 123 is formed by subjecting a metal plate such as a steel plate, a stainless steel plate or an aluminum alloy plate to plastic working, for example, deep drawing. A fitting portion 124 for externally fitting and fixing the cover 123 to the end portion of the opening of the outer ring 102a is formed in the peripheral edge portion of the opening of the cover 123, and a protruding portion 125 for preventing the cover 123 from interfering with the nut 117 is formed in the central portion of the cover 123. A cylindrical holding portion 127 is also formed in a part of an intermediate portion 151 which is situated between the fitting portion 124 and the protruding portion 125. A plastic material 126 for embedding a sensor 112a and the end portion of a harness 130 for use in fetching an output signal of the sensor 112a are inserted in the cylindrical holding portion 127. In this case, the sensor 112a is formed of an IC which combines a detection element such as a Hall element or an MR element for varying the output signal in accordance with variation in the direction of magnetic flux or density with a power supply circuit and a waveform shaping circuit. Of these two circuits, the power supply circuit is used for adjusting the voltage applied to the detection element. The waveform shaping circuit is used for shaping the waveform of the output signal of the detection element. Therefore, the harness 130 functions as what supplies electricity to the power supply circuit and also transmits to a controller of an ABS or TCS the signal sent from the waveform shaping circuit, the waveform of which has been subjected to waveform shaping.

The cylindrical holding portion 127 is such that its axis is substantially parallel to those of the hub 114 and the outer ring 102a, the axis of the cylindrical holding portion 127 being passed through the cover 123. A collar portion 128 in the form of a flange directed outward is formed on the outer peripheral edge of an opening portion at the leading end (the right end of FIG. 8 and the lower end of FIG. 10) of the cylindrical holding portion 127. A pair of retaining projections 129, 129 are formed on the respective outer peripheral edges of the collar portion 128 and in two places opposite to each other in the diametric direction. These retaining projections 129, 129 are tilted toward the base (the left end of FIG. 8 and the upper end of FIG. 10) of the cylindrical holding portion 127 in that the tilting angle is increased toward the leading end edges of the retaining projections 129, 129.

On the other hand, the plastic material 126 has a small-diameter portion 131 which can freely be inserted in the cylindrical holding portion 127 without a gap, and a large-diameter portion 132 formed in the base portion (the right end portion of FIG. 8 and the lower end portion of FIG. 10) of the small-diameter portion 131. The small- and large-diameter portions 131, 132 are made integral with each other via a stepped portion 133, which faces the outer side face (the right side face of FIG. 8 and the lower face of FIG. 10) of the collar portion 128 in such a state that the small-diameter portion 131 has been inserted in the cylindrical holding portion 127. In this state, the sensor 112a that remains embedded in the leading end portion (left end portion of FIG. 8 and the upper end portion of FIG. 10) of the small-diameter portion 131 faces the side face of the tone wheel body 120 constituting the tone wheel 106a. The harness 130 is led out of the plastic material 126 and the base face (the right end face of FIG. 8 and the lower end face of FIG. 10) of the large-diameter portion 132.

Further, a pair of elastic retaining pieces 134, 134 are formed on the respective outer peripheral faces of the large-diameter portion 132 and in two places opposite to each other in the diametric direction. These elastic retaining pieces 134, 134 are tilted toward the leading end (the left end of FIG. 8 and the upper end of FIG. 10) of the small-diameter portion 131 in that the tilting angle is increased toward the leading end edges of the elastic retaining pieces 134, 134. Retaining holes 135, 135 are formed in the leading end portions of the elastic retaining pieces 134, 134, respectively. Each of the retaining holes 135, 135 is large enough to receive each of the retaining projections 129, 129. The space between the leading end portions of the elastic retaining pieces 134, 134 in free condition is set slightly smaller than the space between the leading end edges of the pair of retaining projections 129, 129. A corrugated sheet spring 136 is then held between the outer side face of the collar 128 and the stepped portion 133.

The corrugated sheet spring 136, the pair of retaining projections 129, 129 and the elastic retaining pieces 134, 134 constitute a retaining means, which supports the plastic material 126 within the cylindrical holding portion 127 by axially regulating the positioning of the plastic material 126 with respect to the cylindrical holding portion 127. More specifically, the corrugated sheet spring 136 is elastically compressed between the collar portion 128 and the stepped portion 133 when the large-diameter portion 132 is pressed against the cylindrical holding portion 127 by inserting the small-diameter portion 131 in the cylindrical holding portion 127 in such a state that the corrugated shoot spring 136 is externally fitted to the small-diameter portion 131. While the corrugated sheet spring 136 is kept elastically compressed, the retaining holes 135, 135 formed in the pair of the elastic retaining pieces 134, 134 engage with each other. The plastic material 126 is supported within the cylindrical holding portion 127 in such a state that the positioning of the plastic material 126 is axially regulated.

Further, a retaining groove 137 is formed in the whole outer peripheral face of the intermediate portion of the small-diameter portion 131, and the outer peripheral edge of an O-ring 138 fitted in the retaining groove 137 is brought into elastic contact with the whole inner peripheral face of the cylindrical holding portion 127. The O-ring 138 constitutes a sealing means for preventing extraneous matter such as rainwater from penetrating into the cover 123 through the gap between the inner peripheral face of the cylindrical holding portion 127 and the outer peripheral face of the plastic material 126.

In the case of such a rolling bearing unit with a tachometer as described above, the wheel fixedly secured to the flange 115 fitted to the end portion of the hub 114 can rotatably be supported with the suspension system. When the tone wheel 106a together with the inner ring 1a externally fitted and fixed to the end portion of the hub 114 is rotated as the wheel turns, the output of the sensor 112a facing the tone wheel body 120 constituting the tone wheel 106a varies. Since the frequency at which the output of the sensor 112a varies is proportional to the rotational speed of the wheel, if the output signal of the sensor 112a is input to a controller (not shown) via the harness 130, the ABS or TCS can properly be controlled by obtaining the rotational speed of the wheel.

The aforementioned rolling bearing unit with a tachometer thus arranged according to the present invention functions as what rotatably supports a wheel and detects the rotational speed of the wheel in the same way that any known conventional rolling bearing unit with a tachometer functions. Particularly, the rolling bearing unit with a tachometer according to the present invention is capable of making the plastic material 126 with the sensor 112a embedded therein easily detachable from the cover 123 secured to the outer ring 102a without using a special push-fit jig or the like.

More specifically, when the plastic material 126 is fitted in the cover 123, the small-diameter portion 131 of the plastic material 126 is inserted in the cylindrical holding portion 127 first and the large-diameter portion 132 of the plastic material 126 is pressed against the cylindrical holding portion 127 while the circumferential phases of the pairs of retaining projections 129, 129 and the elastic retaining pieces 134, 134 are made consistent with one another as described above. With this joining work, the leading end portions of the pair of elastic retaining pieces 134, 134 are guided by the retaining projections 129, 129 and displaced in the direction in which the leading end portions thereof are opened to widen the space with respect to the retaining projections 129, 129. Then the elastic retaining pieces 134, 134 are elastically restored (in the direction in which the space between the leading end portions is narrowed) in such a state that the retaining holes 135, 135 formed in the leading ends of the respective elastic retaining pieces 134, 134 and the retaining projections 129, 129 match, whereby the retaining projections 129, 129 are forced into the respective retaining holes 135, 135. Since the corrugated sheet spring 136 has been compressed elastically in that state, the leading end edges of the retaining projections 129, 129 and the inner edges of the retaining holes 135, 135 are elastically brought into contact when the force of pressing the large-diameter portion 132 in released and thus the plastic material 126 is fitted in the cover 123. Since the retaining projections 129, 129 and the elastic retaining pieces 134, 134 are provided in two places opposite to each other in the diametric direction, the plastic material 126 is prevented from being tilted. If, moreover, the elastic retaining pieces 134, 134 are subjected to elastic displacement in a direction in which the space between the leading end edges thereof is widened, the leading end edges of the retaining projections 129, 129 are disengaged from the respective retaining holes 135, 135 and the small-diameter portion 131 is made free from being pulled out of the cylindrical holding portion 127.

The contact area between the inner peripheral face of the cylindrical holding portion 127 and the outer peripheral face of the small-diameter portion 131 is thus sealed up by the O-ring 138 after the small-diameter portion 131 has been inserted in the cylindrical holding portion 127 so as to fit the plastic material 126 in the cover 123. Therefore, no extraneous matter such as rainwater is prevented from penetrating into the cover 123 through the area between both the peripheral faces. Consequently, the sensor 112a and the tone wheel 106a are prevented from being damaged because of freezing.

Any member other than the corrugated sheet spring 136 may be used as what is held between the collar portion 128 at the leading end of the cylindrical holding portion 127 and the stepped portion 133 of the plastic material 126 as long as it is an elastic member capable of reducing the thickness in the axial direction (the lateral direction of FIG. 8 and the vertical direction of FIG. 10) of the cylindrical holding portion 127 when elastically compressed; for example, the leading end edges of the retaining projections 129, 129 and the retaining holes 135, 135 can be kept in engagement with each other by fitting an O-ring in between the collar portion 128 and the stepped portion 133. In reference to the structure shown in FIGS. 8 and 10, the provision of the O-ring in the space portion above can dispense with the retaining groove 137 formed on the outer peripheral face of the intermediate portion of the small-diameter portion 131 and the O-ring 138 fitted in the retaining groove 137. In other words, the O-ring provided in the space portion is used as a component member of the retaining means and simultaneously as a sealing means. A notch may be made in a part of the outer peripheral edge of the collar portion 128 in order to facilitate the work of inserting the sensor 112a in the cover 123 by making consistent the phases of the retaining projections 129, 129 and the elastic retaining piece 134, 134 and besides a projection may be formed from the large-diameter portion 132 of the plastic material 126 toward the leading end (the left end of FIG. 8) of the plastic material 126. During the time the inserting work above is conducted, the retaining projections 129, 129 are made to engage with the retaining holes 135, 135 by inserting the small-diameter portion 131 of the plastic material 126 in the cylindrical holding portion 127 while engaging the projection above with the aforementioned notch.

Figure 12:
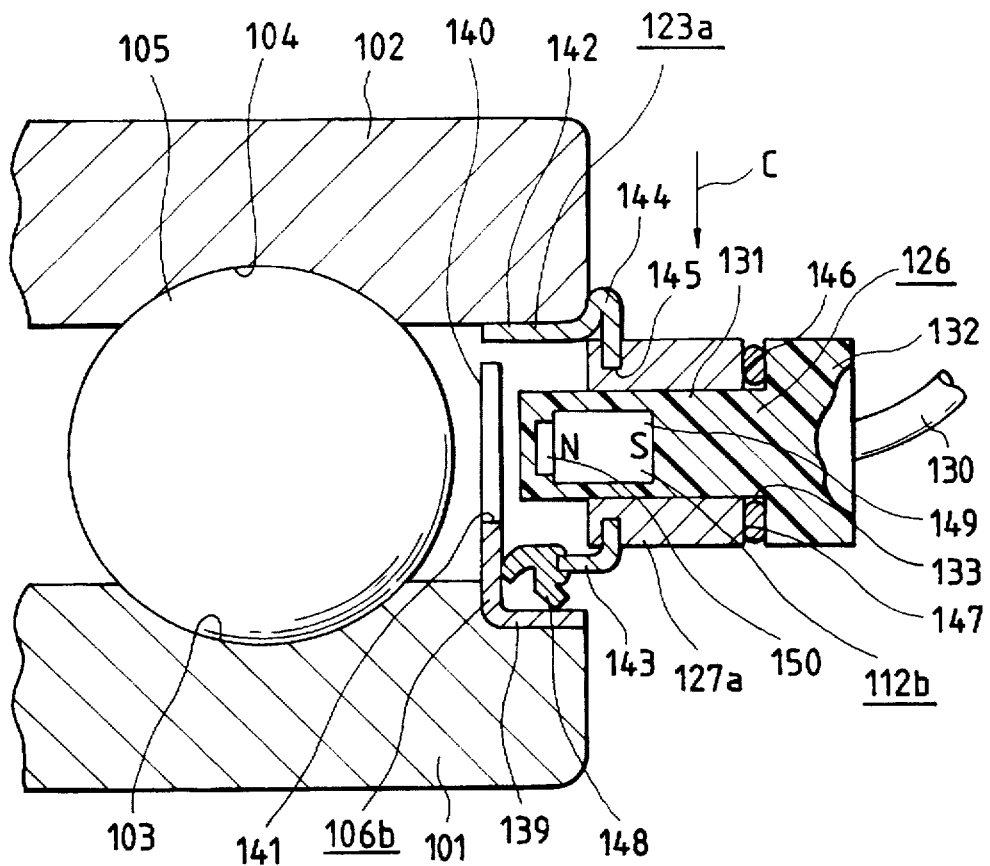
FIG. 12 is a partial sectional view showing a fourth embodiment of the present invention.
Figure 13:
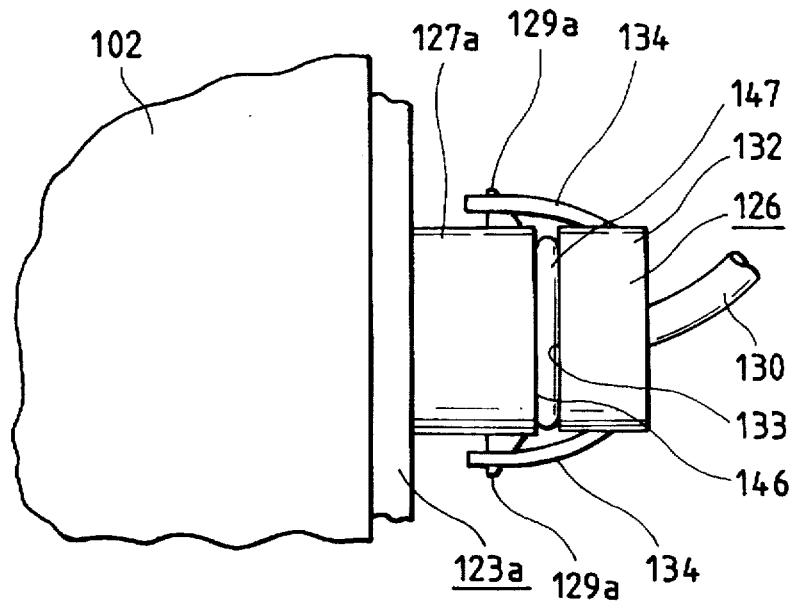
FIG. 13 is a diagram taken on an arrow C in FIG. 12.
Figure 14:
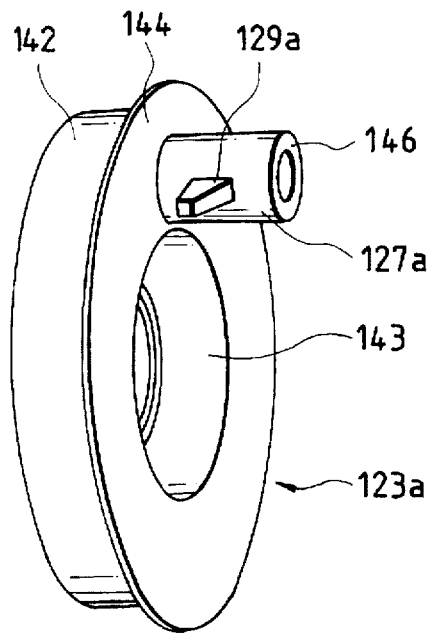
FIG. 14 is a perspective view of a cover provided with a cylindrical holding portion.

FIGS. 12–14 show a fourth embodiment of the present invention, in which an inner ring 101 as a rotary ring is rotatably supported inside an outer ring 102 as a stationary ring. An inner ring raceway track 103 constituting a rotary-side raceway surface is formed on the outer peripheral face of the inner ring 101 as a rotary-side peripheral face, whereas an outer ring raceway track 104 constituting a stationary-side raceway surface is formed on the inner peripheral face of the outer ring 102 as a stationary-side peripheral face. A plurality of rolling elements 105 are installed between the inner ring raceway track 103 and the outer ring raceway track 104. An annular tons wheel 106b is externally fitted and fixed to the outer peripheral face of the end portion of the inner ring 101. The tone wheel 106b is made of a magnetic metal plate such as a low carbon steel plate which is generally annular and L-shaped in cross section. The tone wheel 106b has a cylindrical portion 139 which is externally fitted and fixed to the end portion of the inner ring 101 and a circular ring portion 140 which is bent outward in a direction perpendicular to the diametric direction from the end edge portion of the cylindrical portion 139. A plurality of notches 141 are formed in the outer peripheral edge of the circular ring portion 140 forming a flange surface at equal intervals over the circumferential direction. Therefore, the circular ring portion 140 in the form of comb teeth causes the magnetic properties over the circumferential direction of the flange surface to vary at equal intervals.

On the other hand, an annular cover 123a is internally fitted and fixed to the inner peripheral face of the end portion of the outer ring 102 and used to shut the contact area between the inner peripheral face of the end portion of the outer ring 102 and the outer peripheral face of the end portion of the inner ring 101. The cover 123a has an outer-diameter-side cylindrical portion 142 which is fitted and fixed to the inner peripheral face of the end portion of the outer ring 102, an inner-diameter-side cylindrical portion 143 which is concentric with the outer-diameter-side cylindrical portion 142 and a circular ring portion 144 for making continuous the end edges of both the cylindrical portions 142, 143. A through-hole 145 is formed in a part of the circular ring portion 144 and a plastic cylindrical holding portion 127a is secured by injection molding (mold-forming) to the inside of the through-hole 145. A pair of retaining projections 129a, 129a are formed on the outer peripheral face of the leading end portion (the right end portion of FIGS. 12–13) of the cylindrical holding portion 127a in places opposite to each other in the diametric direction. The retaining projections 129a, 129a are each made to engage with retaining holes (not shown) of a pair of elastic retaining pieces 134, 134 formed on the outer peripheral face of the large-diameter portion 132 of a plastic material 126 with a sensor 112b. These retaining projections 129a, 129a, the elastic retaining pieces 134, 134 and a packing 147, which will be described below, constitute an engaging means. Although the pair of the retaining projections 129a, 129a are provided in the places opposite to each other in the diametric direction according to this embodiment of the invention, a retaining projection in the form of a flange continuous in the circumference direction may be formed instead; in this case, an elastic retaining piece continuous in the circumference direction is formed on the outer peripheral face of the plastic material 126. Further, retaining grooves are formed at a certain pitch in the whole inner peripheral face at the leading end of the elastic retaining piece.

According to this embodiment of the invention, the packing 147 made of an elastic material such as rubber and elastomer is elastically compressed between the stopped portion 133 of the plastic material 126 and the leading end face 146 of the cylindrical holding portion 127a. The elastic force of the packing 147 as a sealing means is used to contact the retaining projections 129a, 129a with the side edges of the retaining holes and thus extraneous matter such as rainwater is prevented from penetrating into the cover 123a through the gap between the inner peripheral face of the cylindrical holding portion 127a and the outer peripheral face of the small-diameter portion 131 of the plastic material 126. The leading end edges of a pair of sealing lips constituting a sealing ring 148 supported with the inner-diameter-side cylindrical portion 143 are each kept in slidable contact with the outer peripheral face of the cylindrical portion 139 constituting the tone wheel 106b and the inner-diameter-side face of the circular ring portion 140. Therefore, there is no room for extraneous matter to penetrate into the cover 123a through the cover 123a and the tone wheel 106b.

A permanent magnet 149 is provided on the side of the sensor 112b as the tone wheel 106b in simply formed of a magnetic metal plate according to this embodiment of the invention. In other words, the sensor 112b is made by combining the permanent magnet 149 magnetized in the axial direction (the lateral direction of FIG. 12) with an IC 150 in series over the magnetizing direction. In this case, the IC 150 is what combines a detection element such as a Hall element or an MR element for varying the output signal in accordance with variation in the direction of magnetic flux or density with a power supply circuit and a waveform shaping circuit. When the tone wheel 106b is rotated and when the IC 150 alternately faces the notch 141 and a tongue existing between the adjoining notches 141, the density of magnetic flux passing through the detection element incorporated in the IC 150 varies, thus causing the output of the IC 150 to vary. Since the frequency of the variations is proportional to the rotational speed of the inner ring 101, the rotational speed of the wheel can be obtained by inputting the output signal of the sensor 112b incorporating the IC 150 via a harness 130 to a controller (not shown), whereby an ABS or TCS becomes properly controllable. The remaining constitution and function are substantially similar to those of the third embodiment of the present invention. According to this fourth embodiment of the invention, the inner peripheral face of the cylindrical holding portion 127a may be made non-cylindrical such as square cylindrical in order to facilitate the phase matching of the retaining projections 129a, 129a and the respective retaining holes at the leading ends of the elastic retaining pieces 134, 134. Moreover, the outer peripheral face of the small-diameter portion 131 of the plastic material 126 to be mated with the inner peripheral face of the cylindrical holding portion 127a may be harmonized with the inner peripheral face thereof.

Figure 15:
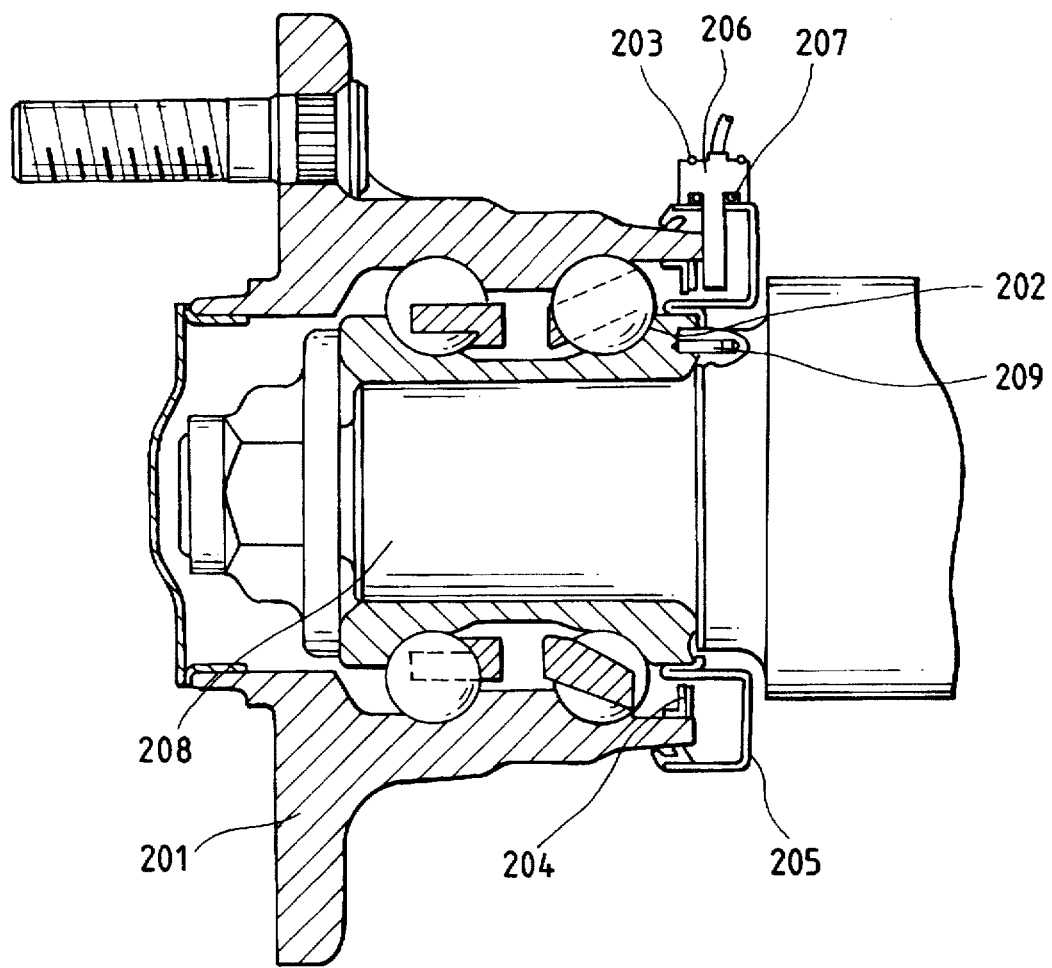
FIG. 15 in a sectional view showning a fifth embodiment of the invention.

FIG. 15 shows a fifth embodiment of the invention, in which an outer ring 201 is a rotating ring and an inner ring 202 is a stationary ring. A hold-down member 203 is provided in the proximity of a fitting hole on the outer peripheral face of a cylindrical wall portion. The hold-down member 203 has the name structure as that shown in FIG. 4 (also see FIG. 3). That is, it is formed by bending a wire, for example, having sufficient flexural rigidity and has a hold-down frame portion 41 for holding down the outer edge face 40, pivotal support portions 42, 42 provided at the base portion, and coupling portions 43, 43 for making continuous the hold-down frame portion 41, and both the pivotal support portions 42, 42. Of these portions, the pivotal support portions 42, 42 are pivotally supported with a pivotal support bracket 44. The pivotal support bracket 44 is secured by spot welding or the like to the side face of the fitting hole 33. The hold-down frame portion 41 in this state faces the fitting hole 33. Torsion coil springs 45, 45 are provided between the pivotal support bracket 44 and the hold-down member 39 (203), which is supplied with elastic force urging itself toward the outer peripheral face of the cylindrical wall portion 30. A mating groove 46 for receiving the hold-down frame portion 41 without a backlash is formed on the outer edge face 40 of the base portion 35 of the holding case 32, the outer edge face 40 being situated opposite to the hold-down frame portion 41. While the outer edge face 40 is held down by the hold-down frame portion 41, the hold-down frame portion 41 mates with the mating groove 46 and the positioning of the holding case 32 is determined.

An encoder 204 comprises a core metal formed of a steel plate such as SPCC having a L-shaped cross section, a cylindrical surface of which is fitted into an inner diameter surface of the outer ring 201. A ferrite-containing rubber magnet is fixed to a flange surface of the core metal by burning. The circumference of the side surface of the encoder is magnetized so that multiple poles of N poles and S poles are formed at an equal pitch.

A sensor carrier 205 has a C-shaped cross section. An inner cylindrical surface thereof is fitted onto the inner ring 202 as the stationary ring. The sensor carrier includes a flange surface bent inside in the radius direction from the press-inserted cylindrical surface. The flange surface is made conact with the end face of the inner ring so that positioning in the axial direction is conducted. A seal is attached to the tip end of the outer cylindrical surface, and a lip of the seal slidingly contacts with the outer diameter surface of the outer ring to seal up a sensor 206, the encoder 204 and the bearings.

The outer cylindrical surface of the sensor carrier 205 is provided with an opening for insertion of the sensor, into which the sensor 206 is inserted. The sensor 206 can be attached to and detached from the carrier to enable the exchange of the sensor. A magnetic sensor such as an MR element or a Hall element and a waveform shaping circuit are included in the surface of the sensor opposite to the encoder. The rotation speed of the outer ring can be known by measuring the cycle time of the output voltage waveform of the sensor by an ECU.

A groove is formed on a flange surface which is made contact with the sensor carrier, and an O-ring 207 is fixed in the groove. This O-ring 207 prevents mud water and the like from intruding through a gap between the sensor 206 and the carrier 205.

In order to prevent creep from occurring between the inner ring 202 as the stationary ring and a spindle 208, a spring pin 209 is fitted into a hole opened in the end of the inner ring 202 and the portion thereof extruding from the end face of the inner ring is engaged with a cut or hole provided in the spindle 208.

Figure 16:
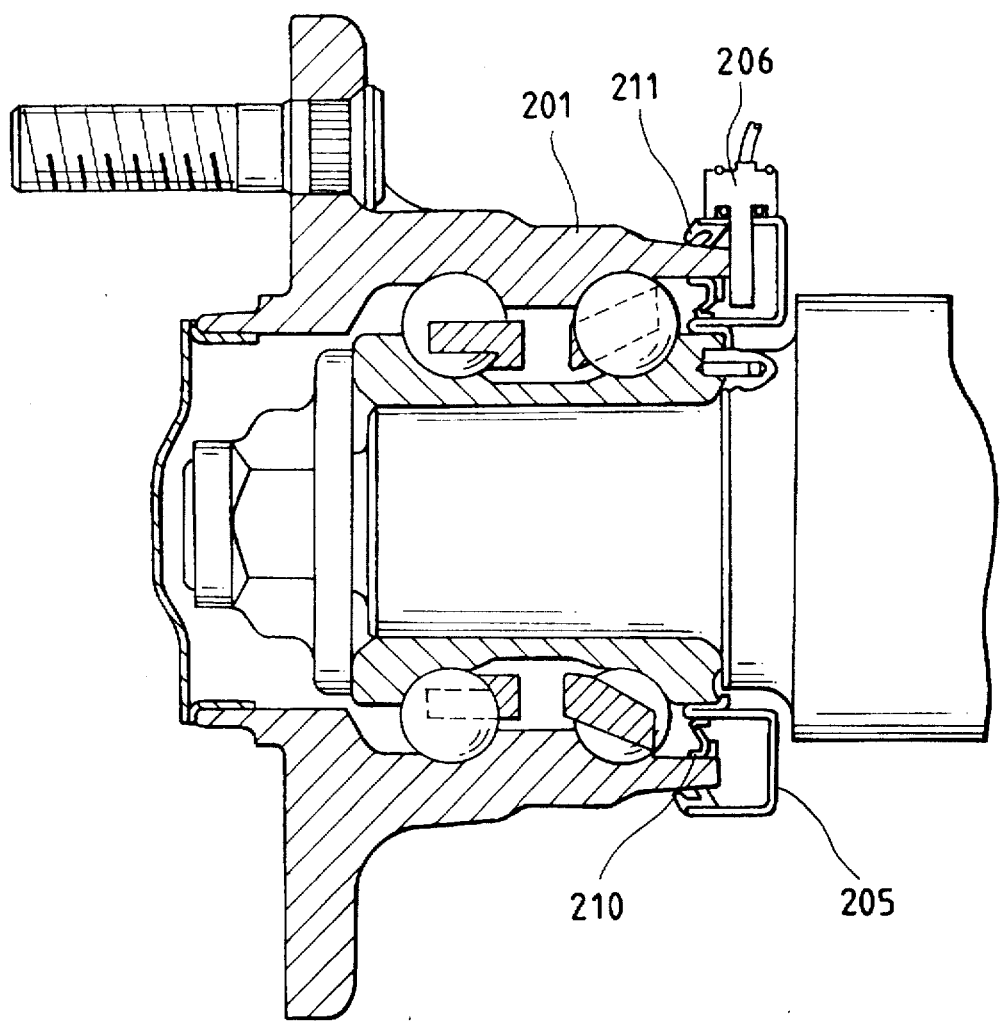
FIG. 16 in a sectional view showing a sixth embodiment of the invention.

FIG. 16 shows a sixth embodiment of the invention which is a modification of the fifth embodiment and in which a contact surface pressure of a sliding lip of a seal 211 attached to a sensor carrier 205 is made low so that a sliding torque of the seal is low.

A seal for sealing the bearing is attached to an encoder 210. A lip thereof slidingly contacts with a cylindrical surface of the carrier 205 to seal up the bearing so that mud water and the like does not intrude into the bearing. Since the diameter of the sliding portion of the seal is small, the torque thereof does not become high.

On the other hand, since the lip of the seal 211 slidingly contact with the outer diameter surface of an outer ring 201, the contact occurs at the portion where the diameter is large. Thus, a seal torque becomes high by a normal seal lip contact pressure. Accordingly, In this embodiment, the seal lip is designed to have a low contact pressure or is made a seal such as a labyrinth seal so that a small amount of mud water is allowed to intrude. However, since a sensor 206 is covered with a resin, no trouble occurs even if the mud water intrudes. Also, since the encoder 210 is made of a waterproof material, there is no problem.

In the case where the seal of this embodiment is used, a seal lip is attached to the encoder 210 to form double sealing structure so that mud water does not intrude into the bearing portion. Further, since the size is controlled so that even if a gap occurs between the lip of the seal 211 and the outer diameter surface of the outer ring 201, the gap is made very small. Thus, there arises no such case where large iron powder intrudes and is attached to the encoder 210 so that the magnetic flux from the encoder is disturbed.

An described above, the rolling bearing unit with a tachometer is thus constituted and made to function, so that it is possible to make a sensor easily detachable and besides prevent the sensor and a tone wheel from being damaged because of frozen waterdrops.

What is claimed is:

1. A rolling bearing unit with a tachometer, comprising:

a rotating race member;

a stationary race member;

a plurality of rolling elements disposed between the rotating race member and the stationary race member;

a cover for closing an end opening of the bearing unit, the cover being fixed to the stationary race member;

an encoder engaged with the rotating race member and having magnetic properties alternately varied in a circumferential direction; and a sensor pressed against the cover by an elastic member engaged with an engaging portion of the cover so that the sensor is attached to the cover in a detachable manner.

2. A rolling bearing unit with a tachometer, comprising:

a rotating race member;

a stationary race member;

a plurality of rolling elements disposed between the rotating race member and the stationary race member;

a cover for closing an end opening of the bearing unit, the cover being fixed to the stationary race member;

an encoder engaged with the rotating race member and having light transmitting portions and light blocking portions alternately disposed at an equal pitch in a circumferential direction; and a sensor pressed against the cover by an elastic member engaged with an engaging portion of the cover so that the sensor is attached to the cover in a detachable manner.

3. A rolling bearing unit with a tachometer, comprising:

a stationary ring which has a stationary-side raceway surface on a stationary-side peripheral face and is not rotated at the time of its use;

a rotary ring which has a rotary-side raceway surface on a rotary-side peripheral face and is rotated at the time of its use;

a plurality of rolling elements provided between the stationary-side raceway surface and the rotary-side raceway surface;

a tone wheel which is generally annular and has a flange surface existing in a direction perpendicular to an axis of the rotary ring while supported with the rotary ring and has magnetic properties of the flange surface alternately varied at equal intervals over a circumferential direction;

a cover which is fixedly secured to an end portion of the stationary ring and used to close an opening of an end portion of the stationary ring;

a sensor which faces the flange surface of the tone wheel in such a state that it is supported with the cover;

a cylindrical wall portion as a part of the cover, said cylindrical wall portion existing outwardly in a diametric direction of the tone wheel and having a fitting hole for communicating an inner peripheral face of the cylindrical wall portion with an outer peripheral face thereof;

a holding case for holding the sensor, the holding case having an inserting portion which is inserted through the fitting hole from an outer diameter side of the cylindrical wall portion to an inner diameter side thereof and a base portion which is brought into contact with a peripheral portion of the fitting hole on an outer peripheral face of the cylindrical wall portion, the base portion facing the outer peripheral face of the cylindrical wall portion in such a state that the inserting portion has been inserted in the fitting hole;

a sealing member, a space between the holding case and the fitting hole being sealed up with the sealing member; and a hold-down member for holding down the base portion of the holding case toward the outer peripheral face of the cylindrical wall portion, a base portion of the hold-down member being pivotally fitted to a position which is on the outer peripheral face of the cylindrical wall portion and close to the fitting hole so that a leading end portion of the hold-down member elastically presses the base portion of the holding case against the outer peripheral face of the cylindrical wall portion.

4. A rolling bearing unit with a tachometer, comprising:

a stationary ring which has a stationary-side raceway surface on a stationary-side peripheral face and is not rotated at the time of its use;

a rotary ring which has a rotary-side raceway surface on a rotary-side peripheral face and is rotated at the time of its use;

a plurality of rolling elements provided between the stationary-side raceway surface and the rotary-side raceway surface;

a tone wheel which is generally annular and has a flange surface existing in a direction perpendicular to an axis of the rotary ring while supported with the rotary ring and has magnetic properties of the flange surface alternately varied at equal intervals over a circumferential direction;

a cover which is fixedly secured to an end portion of the stationary ring and used to close an opening of an end portion of the stationary ring;

a sensor which faces the flange surface of the tone wheel in such a state that it is supported with the cover;

a cylindrical holding portion having an axis substantially parallel to an axis of the rotary ring, the cylindrical holding portion being formed in a portion of the cover where it faces the flange surface of the tone wheel so as to communicate an inside of the cover with an outside thereof;

a plastic material which can freely be inserted in the cylindrical holding portion, the sensor together with an end portion of a harness for fetching an output signal of the sensor being embedded in the plastic material;

engaging means for properly axially positioning and supporting the plastic material in the cylindrical holding portion, said engaging means being provided between the cylindrical holding portion and the plastic material; and sealing means for preventing extraneous matter from penetrating into the cover through a contact area between an inner peripheral face of the cylindrical holding portion and an outer peripheral face of the plastic material, the sealing means being provided between the cylindrical holding portion and the plastic material;

wherein the sensor is pressed against the cover by the sealing means engaged with the engaging means so that the sensor is attached to the cover in a detachable manner.

* * * * *